Figure 1:
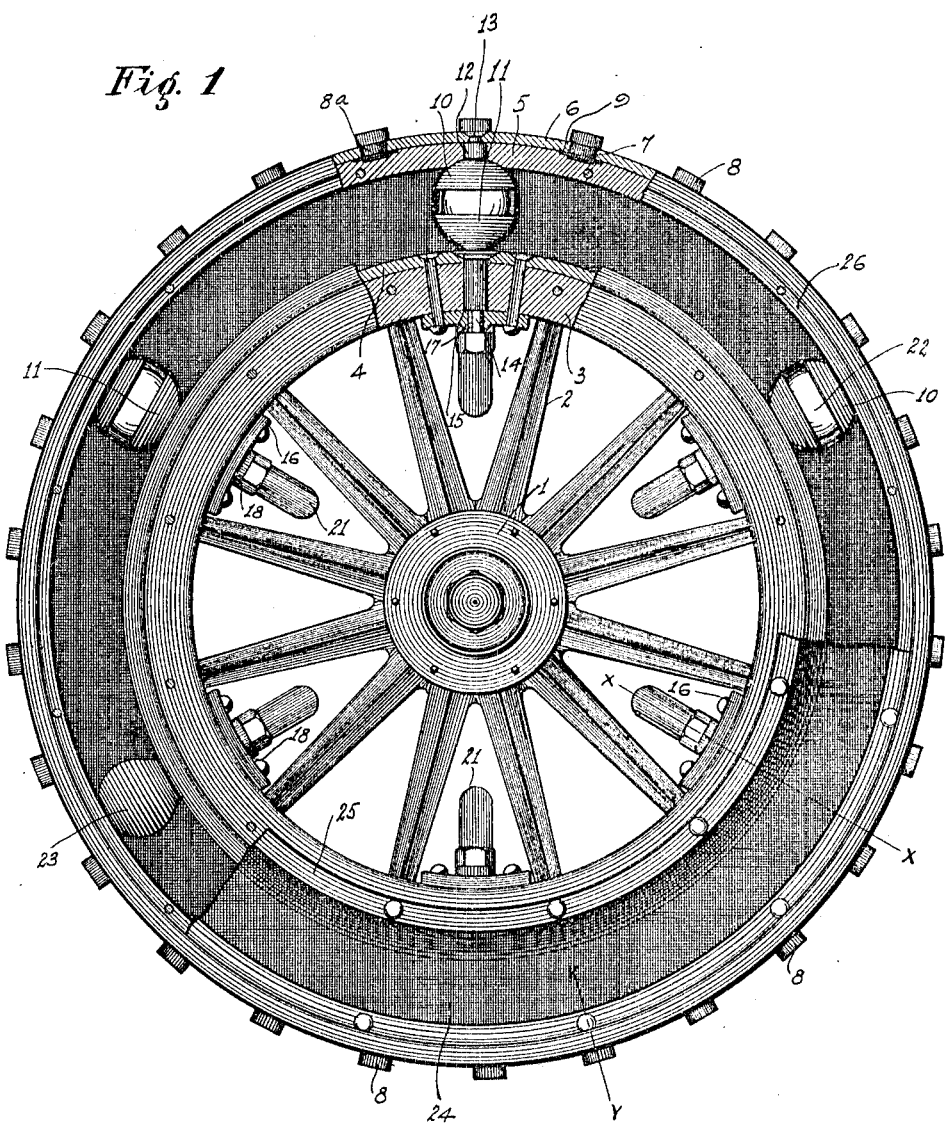

C. H. GUNN.
RESILIENT WHEEL.
APPLICATION FILED JULY 7, 1913.

1,105,650.

Patented Aug. 4, 1914.
2 SHEETS—SHEET 1.

WITNESSES:
Clarence M. Smith
J. B. Webster

INVENTOR.
Charles H. Gunn
BY
ATTORNEYS.

C. H. GUNN.
RESILIENT WHEEL.
APPLICATION FILED JULY 7, 1913.
1,105,650.
Patented Aug. 4, 1914.
2 SHEETS—SHEET 2.
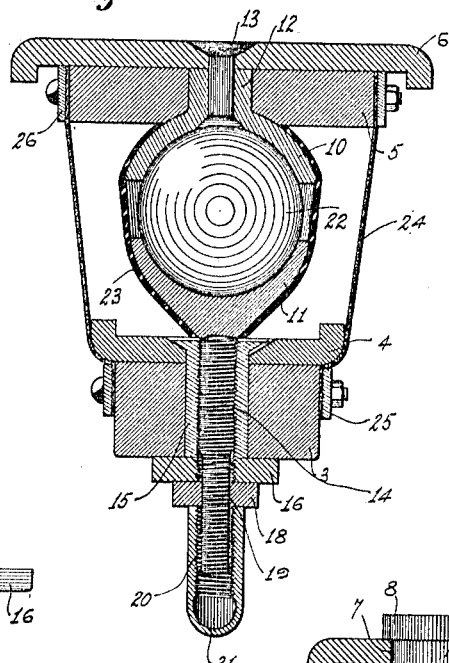
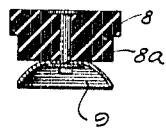
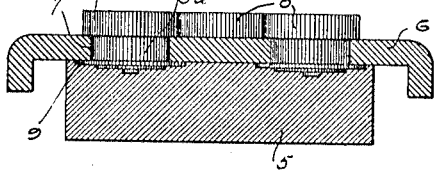
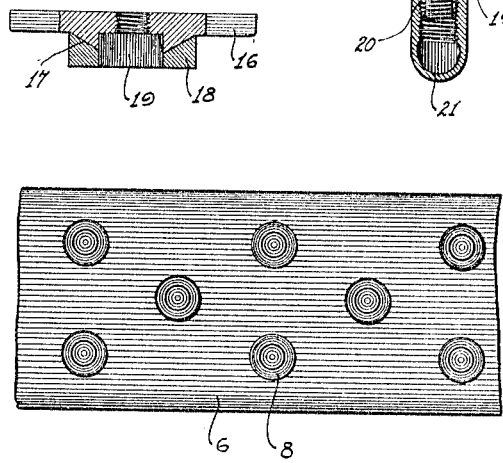
WITNESSES:
Clarence M. Smith
J. B. Webster
INVENTOR.
Charles H. Gunn
BY
ATTORNEY

UNITED STATES PATENT OFFICE.

CHARLES H. GUNN, OF MODESTO, CALIFORNIA, ASSIGNOR OF ONE-HALF TO ERNEST GREEN, OF STANISLAUS COUNTY, CALIFORNIA.

RESILIENT WHEEL.

1,105,650.

Specification of Letters Patent.

Patented Aug. 4, 1914.

Application filed July 7, 1913. Serial No. 777,620.

*To all whom it may concern:*

Be it known that I, CHARLES H. GUNN, a citizen of the United States, residing at Modesto, in the county of Stanislaus, State of California, have invented certain new and useful Improvements in Resilient Wheels; and I do declare the following to be a clear, full, and exact description of the same, such as will enable others skilled in the art to which it appertains to make and use the same, reference being had to the accompanying drawings, and to the characters of reference marked thereon, which form a part of this application.
This invention relates to improvements in vehicle wheels of all kinds, the object of the invention being to produce a vehicle wheel adapted to displace the use of pneumatic tires and at the same time provide a resiliency and shock absorption equal to, if not better than, that of pneumatic tires.

A further object of the invention is to produce a simple and inexpensive device and yet one which will be exceedingly effective for the purposes for which it is designed.

These objects, I accomplish by means of such structure and relative arrangement of the parts as will fully appear by a perusal of the following specification and claim.
On the drawings, similar characters of reference indicate corresponding parts in the several views.

Figure 1 is a side elevation of a complete wheel partly broken out and in section. Fig. 2 is a sectional view taken on a line X—X of Fig. 1. Fig. 3 is a sectional view taken on a line Y—Y of Fig. 1. Fig. 4 is a top plan view of a portion of the tread of the wheel. Fig. 5 is a detached view in section, of an adjustment pin lock. Fig. 6. is a sectional view of a tractive member for the rim of the wheel showing it just prior to its insertion into the rim.

Referring now more particularly to the characters of reference on the drawings, the numeral 1 designates the hub of the wheel, 2 the spokes and the numeral 3 the felly.

In providing my improved structure, I first shrink a steel rim 4 around the felly 3.
Spaced from the rim 4 I provide another felly 5 shrunk onto which is a steel outer rim 6. Said outer rim is provided with a plurality of holes 7, the felly 5 being slightly countersunk underneath each of said holes.
I then provide tractive members for the rim 6, such members comprising leather or other suitable buttons or lugs 8 having shanks $8^a$ adapted to project through the holes 7, such shanks $8^a$ having slightly cup-shaped disks
9 on their lower ends. To insert these members 8 in the holes 7, the shanks $8^a$ and disks 9 are projected into said holes and then they are tapped therein until the cup-shaped disks 9 flatten out and project into the countersunk portion in the felly 5 underneath the rim 6 which locks the members 8 in position. By means of this structure, the members 8 will be removed when worn out and new ones inserted at will.

I provide a resilient means between the rim 4 and the felly 5, which means consists of a plurality of pairs of cups or socket members 10 and 11, the members 10 having sleeves 12 projecting into the felly and turnably disposed upon pins 13 projecting downwardly from the rim 6. The members 11 are provided with threaded pins 14 screw mounted in sleeves 15 suitably secured through the felly 3 and the rim 4. Said pins 14 are normally prevented from turning by means of plates 16 fitted over said pins and riveted to the felly 3, which plates have projecting lugs 17 adapted to receive corresponding washers 18 in such a manner as to prevent said washers 18 from turning, the said washers having flat shoulders 19 on their interior surfaces adapted to fit over corresponding flat portions 20 on the outer ends of the pins 14. A cap 21 normally fits over the end of the pin 14 to prevent dirt and dust from getting into the connected parts.

Between each pair of cups 10 and 11, I provide solid rubber or other similar resilient balls 22 and the exact tension and resiliency of these balls is adjusted by removing the cap 20 and washers 18 and turning the pins 14 which causes them to advance through their outer connections with the sleeves 15 to advance the cups 11 toward or away from the balls 22.

As can readily be seen the ball and socket structure interposed between the rims 4 and fellies 5 provide a complete resiliency either laterally or transversely for the outer rim 6 thus causing it to receive and compensate for the jolts and jars of the road surface over which the wheel may travel and this will be equal to, if not better than, the action of pneumatic tires inasmuch as such ball and socket construction permits the outer rim to give way in any possible direction irrespective of the point at which the jolt or jar may be encountered.

The pair of members 10 and 11 and their corresponding balls 22 are completely inclosed in a covering of rubber or other suitable material 23 which keeps out dust and dirt, and the entire space between the rim 4 and felly 5 is likewise protected from dust and dirt by leather or other fabric side covers 24 suitably fastened to the fellies 3 and 5 by means of suitable side plates or rings 25 and 26 respectively or other suitable securing means.

From the foregoing description it will be readily seen that I have produced such a device as substantially fulfils the objects of the invention as set forth herein.

While this specification sets forth in detail the present and preferred construction of the device, still in practice, such deviations from such detail may be resorted to as do not form a departure from the spirit of the invention.

Having thus described my invention what I claim as new and useful and desire to secure by Letters Patent is:—

A device of the character described comprising the combination with a wheel, a plurality of pins screw mounted through the entire thickness of the felly and rim of said wheel and provided with projecting stems within the inner periphery of said felly, each of said stems being flattened on one or more sides, a socket member on the outer end of each of said pins, an auxiliary felly spaced from said wheel, and provided with socket members disposed in alinement with the socket members on said pins, resilient means interposed between each pair of said socket members, and means for locking said pins against rotation, such means comprising plates projecting from said stems and secured to said felly, projecting lugs on said plates, washers mounted over said stems, such washers having flat shoulders on their inner surfaces engaging the flat sides of said stems, lugs on said washers engaging the lugs on said plates and caps screw mounted on said stems and engaging said washers to hold them in contact with said plates, as described.

In testimony whereof I affix my signature in presence of two witnesses.

CHARLES H. GUNN.

Witnesses:
  STEPHEN M. BLEWETT,
  CLARENCE M. SMITH.

Copies of this patent may be obtained for five cents each, by addressing the "Commissioner of Patents, Washington, D. C."